No. 887,098. PATENTED MAY 12, 1908.
G. & H. D. KLEIN.
COMBINATION COVER AND STRAINER.
APPLICATION FILED APR. 24, 1907.

Inventors.
George Klein.
Henry D. Klein.

Witnesses:
Phil E. Barnes
Aug P. Albright

By O'Meara & Brock
Attorney

UNITED STATES PATENT OFFICE.

GEORGE KLEIN AND HENRY D. KLEIN, OF BUTTERNUT, WISCONSIN.

COMBINATION COVER AND STRAINER.

No. 887,098.     Specification of Letters Patent.     Patented May 12, 1908.

Application filed April 24, 1907. Serial No. 370,079.

*To all whom it may concern:*

Be it known that we, GEORGE KLEIN and HENRY D. KLEIN, citizens of the United States, residing at Butternut, in the county of Ashland and State of Wisconsin, have invented a new and useful Improvement in a Combination Cover and Strainer, of which the following is a specification.

This invention relates to improved covers and strainers for sauce-pans and other culinary vessels used for boiling vegetables, and the like; the object being to provide a cheap and simple combination cover and strainer by means of which the boiling water can be readily poured from the vessel without any danger of the hands of the operator being scalded by the escaping steam.

Another object of our invention is to so construct the knob or handle of the device that it shall be normally held in a plane above the cover so as to prevent the same from becoming heated thereby overcoming the difficulties with devices of this character now in use.

With these and other objects in view, our invention consists in the novel features of construction, combination and arrangement of parts hereinafter fully described and pointed out in the claims.

Figure 1:
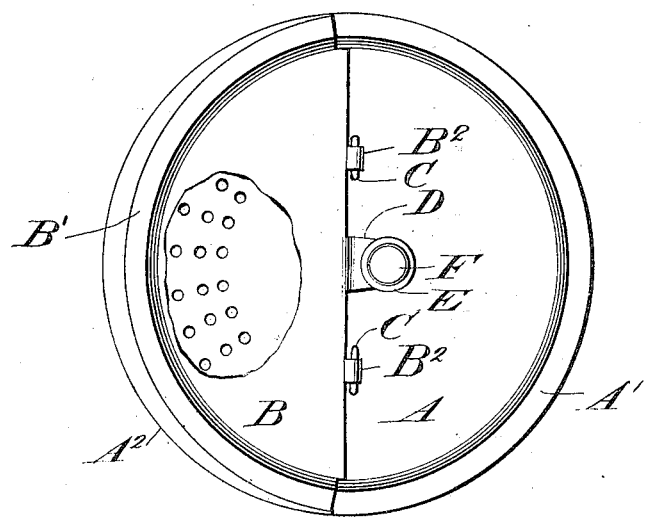
Figure 2:
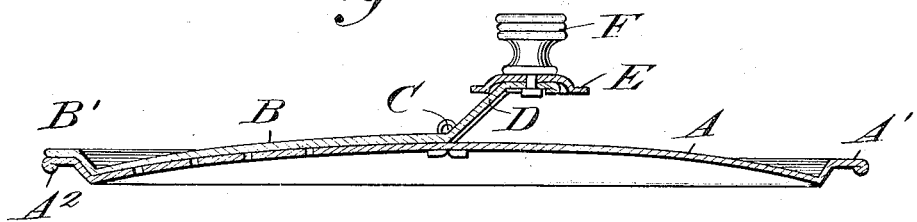
Figure 3:
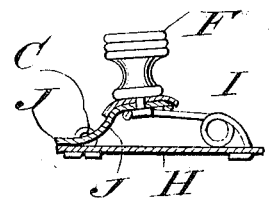

In the drawing forming a part of this specification:—Figure 1 is a top plan view showing the cover closed and partly broken away to show the strainer. Fig. 2 is a section taken on the lines 2—2 of Fig. 1. Fig. 3 is a detail sectional view of a modification.

Referring to the drawing A indicates a cover provided with an angled peripheral flange A' having a beading A² adapted to fit over the rim of the cooking vessel so as to prevent the lid from slipping off the same. The cover is provided with a plurality of perforations in one side, so that the water can be readily drained from the vessel without removing the cover.

Arranged on the cover A is a semi-circular lid B provided with an angled peripherical flange B' adapted to fit over the cover A so as to completely close the perforations of the cover and to form a shield for the hand of the operator when in the act of pouring the water off the vegetables in the vessel through the perforations. The lid is provided with spaced tongues B² projecting out from its straight edge which are bent back upon themselves to form eyes which are pivotally mounted on staples C secured in the cover forming fingers, so that the cover can be readily raised and lowered. The lid being normally held down on the cover by its own weight so as to completely close the perforations. The ends of the flanges of the lid are notched so that the lid can be readily raised without the ends of the flanges binding.

A tongue D projects upwardly and outwardly from the center of the straight edges of the cover, the edges of which are bent back upon themselves so as to stiffen and strengthen the same. An opening is formed in the tongue adjacent its end, over which is arranged a washer E on which is arranged a wooden handle F provided with a bolt which extends through the washer and openings in the tongue, and is secured in place by a nut. It will be readily seen that the tongue forms a lever so that when pushed down, the lid will be raised and when released will drop by its own weight so as to close the perforations.

In the modification shown in Fig. 3, we provide the cover H with a wire spring I which fits under the tongue J' of the lid J so as to hold the lid down tightly over the cover.

From the foregoing it will be readily seen that we have provided a very simple and cheap device which can be easily and quickly operated and one which is very effective in use.

Having thus fully described our invention, what we claim as new and desire to secure by Letters Patent is:—

1. In a device of the kind described, the combination with a cover provided with a plurality of perforations, of spaced staples secured in said cover and projecting up above said cover, a semi-circular lid provided with spaced tongues on its straight edge bent around said staples and a tongue extending upwardly and outwardly and centrally from the straight edge of the lid, said tongue having its edges bent back upon themselves and provided with a handle.

2. In a cover and strainer, for culinary vessels, a cover provided with a series of perforations, of spaced staples secured in said cover, a semi-circular lid arranged on said cover, having spaced tongues projecting outwardly from its straight edge bent back upon themselves to form eyes which are pivotally mounted in the staples secured in the cover, and a tongue extending upwardly and outwardly centrally from the straight edge of the lid having its edges bent back upon themselves and provided with a handle whereby when pressed downwardly, the lid will be raised.

GEORGE KLEIN.
HENRY D. KLEIN.

Witnesses.
JOHN M. BROWN,
HUBERT H. YANKEE.